United States Patent
Jung et al.

(10) Patent No.: US 12,531,631 B2
(45) Date of Patent: Jan. 20, 2026

(54) METHOD AND APPARATUS FOR MANAGING TRACKING AREA UPDATE IN NEXT-GENERATION SATELLITE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 316 days.

(21) Appl. No.: 18/283,962

(22) PCT Filed: Mar. 25, 2022

(86) PCT No.: PCT/KR2022/004241
§ 371 (c)(1),
(2) Date: Sep. 25, 2023

(87) PCT Pub. No.: WO2022/203459
PCT Pub. Date: Sep. 29, 2022

(65) Prior Publication Data
US 2024/0171261 A1      May 23, 2024

(30) Foreign Application Priority Data
Mar. 26, 2021   (KR) .................. 10-2021-0039791

(51) Int. Cl.
*H04B 7/185*   (2006.01)
*H04W 76/27*   (2018.01)
*H04W 84/06*   (2009.01)

(52) U.S. Cl.
CPC ..... *H04B 7/18513* (2013.01); *H04B 7/18539* (2013.01); *H04B 7/18545* (2013.01); *H04W 76/27* (2018.02); *H04W 84/06* (2013.01)

(58) Field of Classification Search
CPC ........... H04B 7/18513; H04B 7/18539; H04B 7/18545; H04W 76/27; H04W 84/06;
(Continued)

(56) References Cited

U.S. PATENT DOCUMENTS

2007/0149191 A1* 6/2007 Wu ..................... H04W 48/16
455/434
2020/0221372 A1   7/2020 Shih et al.
(Continued)

FOREIGN PATENT DOCUMENTS

KR   10-2022-0103576 A    7/2022

OTHER PUBLICATIONS

Trichias, Konstantinos, Panagiotis Demestichas, and Nikolaos Mitrou. "Inter-plmn mobility management challenges for supporting cross-border connected and automated mobility (cam) over 5g networks." Journal of ICT Standardization 9.2 (2021): 113-146. (Year: 2021).*
(Continued)

*Primary Examiner* — Sharad Rampuria
(74) *Attorney, Agent, or Firm* — Jefferson IP Law, LLP

(57) ABSTRACT

The present invention relates to a method performed by a terminal operating in a stand-alone non-public network (SNPN) connection mode in a communication system. The method comprises the steps of: receiving, from a base station, a radio resource control (RRC) release message including reservation configuration information; entering an RRC deactivation state on the basis of the RRC release message; performing a cell reselection procedure; and triggering an RNA update procedure when a cell selected according to the reselection procedure is not included in cell information included in notification area information.

14 Claims, 11 Drawing Sheets

(58) Field of Classification Search
CPC ..... H04W 48/16; H04W 48/18; H04W 48/20; H04W 60/04; H04W 60/06; H04W 84/10; H04W 8/02
See application file for complete search history.

(56) References Cited

U.S. PATENT DOCUMENTS

| | | | |
|---|---|---|---|
| 2020/0314731 A1 | 10/2020 | Ryu et al. | |
| 2021/0307055 A1* | 9/2021 | Tsai | H04W 76/30 |
| 2022/0232464 A1* | 7/2022 | Matolia | H04B 7/18554 |

OTHER PUBLICATIONS

3rd Generation Partnership Project; Technical Specification Group Radio Access Network; NR; User Equipment (UE) procedures in Idle mode and RRC Inactive state (Release 16), 3GPP Draft; 38304-G00, 3rd Generation Partnership Project (3GPP), Mobile Competence Centre ; 650, Route Des Lucioles ; F-06921 Sophia-Antipolis Cedex ; France, XP051870333, Apr. 9, 2020.

Huawei et al: Support Inactive for SNPN and CAG, 3GPP Draft; R2-1910557, Support Inactive for SNPN and CAG, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; XP051768333, Aug. 16, 2019.

3rd Generation Partnership Project; Technical Specification Group Services and System Aspects; Study on enhanced support of non-public networks (Release 17), 3GPP Standard; Technical Report; 3GPP TR 23.700-07, 3rd Generation Partnership Project (3GPP), Mobile Competence Centre ; 650, Route Des Lucioles ; F-06921 Sophia-Antipolis Cedex ; France, vol. SA WG2, No. V2.0.0 pp. 1-248, XP052000005, Mar. 15, 2021.

Extended European Search Report dated Aug. 30, 2024, issued in European Application No. 22776159.0-1206.

Huawei et al., Control plane common aspects for SDT, R2-2101184, 3GPP TSG-RAN WG2 #113-e, Emeeting, Jan. 15, 2021.

Samsung (Rapporteur), Inclusive language review for TS 36.331, R2-2101988, 3GPP TSG-RAN WG2 Meeting #113e, Electronic Meeting, Feb. 4, 2021.

Samsung Electronics et al., Corrections to acquisition of positioning SIBs, R2-2102127, 3GPP TSG-RAN2 Meeting #113 Electronic, Feb. 10, 2021.

SA2, AN-PDB and PER targets for satellite access, 3GPP TSG RAN WG2#113-e R2-2100067 e-Meeting, Jan. 11, 2021.

3GPP TS 38.331 V16.5.0 (Jun. 2021), 3rd Generation Partnership Project; Technical Specification Group Radio Access Network; NR; Radio Resource Control (RRC) protocol specification, (Release 16), Jul. 6, 2021.

* cited by examiner

METHOD AND APPARATUS FOR MANAGING TRACKING AREA UPDATE IN NEXT-GENERATION SATELLITE COMMUNICATION SYSTEM

TECHNICAL FIELD

The disclosure relates to operations of a UE and a base station in a next generation satellite communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The disclosure proposes a method for transitioning a UE that operates in an SNPN access mode to an RRC inactive state, and a method in which a UE in the RRC inactive state performs an RNAU.

Further, the disclosure proposes a method in which an NTN UE performs a registration update with a satellite cell/base station.

Solution to Problem

According to the disclosure to solve the above-described problems, a method performed by a UE operating in a stand-alone non-public network (SNPN) access mode in a communication system includes: receiving, from a base station, a radio resource control (RRC) release message including suspension configuration information, the suspension configuration message including notification area information; entering an RRC inactive state based on the RRC release message; performing a cell reselection procedure;

and triggering an RNA update procedure in case that a cell selected according to the reselection procedure is not included in cell information included in the notification area information, wherein the cell information is related to an SNPN registered in the UE in case that a public land mobile network (PLMN) identifier is not included in the notification area information.

Further, according to the disclosure to solve the above-described problems, a UE operating in a stand-alone non-public network (SNPN) access mode in a communication system includes: a transceiver; and a controller coupled with the transceiver and configured to: receive, from a base station, a radio resource control (RRC) release message including suspension configuration information, the suspension configuration message including notification area information, enter an RRC inactive state based on the RRC release message, perform a cell reselection procedure, and trigger an RNA update procedure in case that a cell selected according to the reselection procedure is not included in cell information included in the notification area information, wherein the cell information is related to an SNPN registered in the UE in case that a public land mobile network (PLMN) identifier is not included in the notification area information.

Advantageous Effects of Invention

Through the disclosure, it is possible for the UE to be transitioned to the RRC inactive state in the SNPN access mode and to efficiently perform a communication by performing an RNAU in the RRC inactive state.

Further, through the disclosure, it is possible for the UE to efficiently perform a registration update with the satellite cell/base station.

MODE FOR THE INVENTION

Hereinafter, the operation principle of the disclosure will be described in detail with reference to the accompanying drawings. In describing the disclosure hereinafter, detailed explanation of related known functions or configurations will be omitted if it is determined that it obscures the gist of the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure.

In describing the disclosure hereunder, a detailed description of a related known function or constitution will be omitted if it is deemed to make the gist of the disclosure unnecessarily vague. Hereinafter, embodiments of the disclosure will be described with reference to the accompanying drawings.

In the following description, a term to identify an access node, a term to denote network entities, a term to denote messages, a term to denote an interface between network entities, and a term to denote a variety of types of identity information have been exemplified for convenience in explanation. Accordingly, the disclosure is not limited to the terms to be described later, and other terms to denote targets having equivalent technical meanings may be used.

For convenience in explanation, in the disclosure, terms and names defined in the 3rd Generation Partnership Project Long Term Evolution (3GPP LTE) standards are used. However, the disclosure is not restricted by the terms and names, and it may be equally applied to systems complying with other standards. In the disclosure, for convenience in explanation, an eNB may be interchangeably used with a gNB. That is, a base station that is explained as an eNB may be represented as a gNB.

Figure 1:
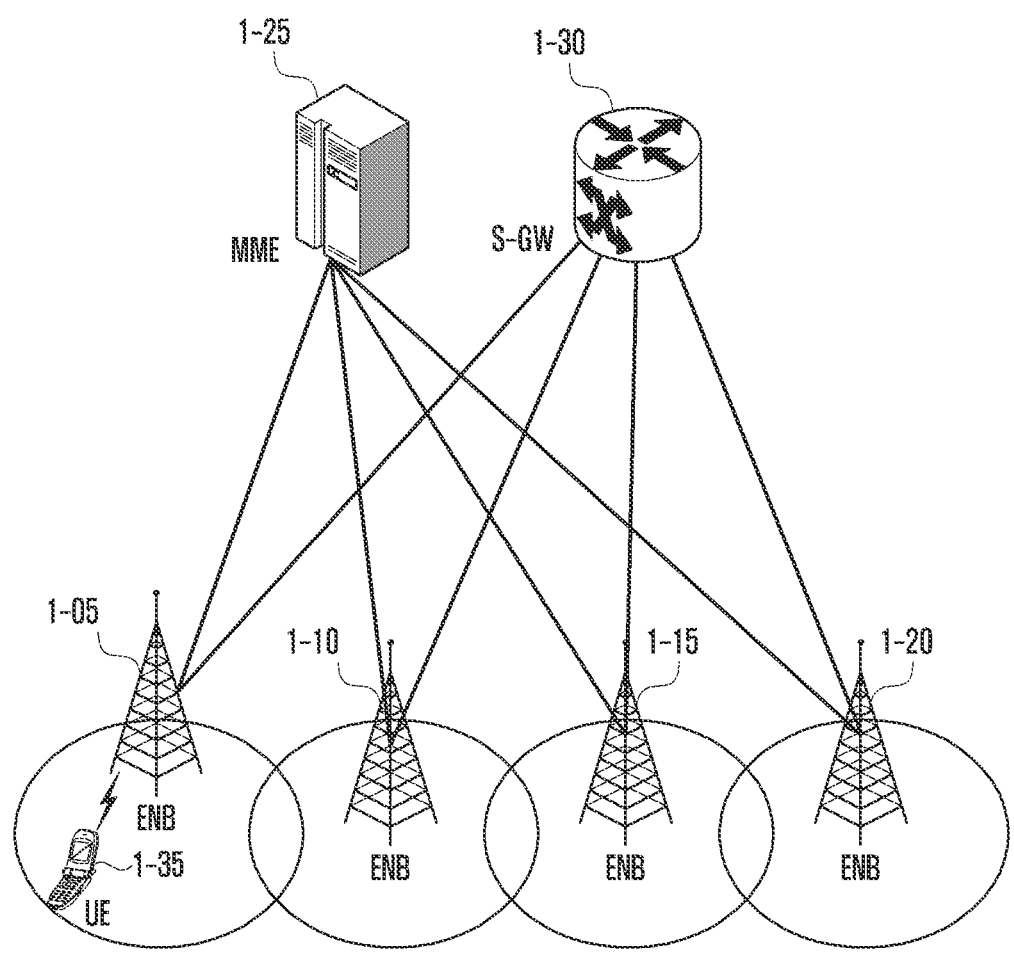
FIG. 1 is a diagram illustrating the structure of an LTE system according to an embodiment of the disclosure.

FIG. 1 is a diagram illustrating the structure of an LTE system according to an embodiment of the disclosure.

With reference to FIG. 1, as illustrated, a radio access network of an LTE system may be composed of evolved node Bs (hereinafter referred to as "ENBs", "node Bs", or "base stations") 1-05, 1-10, 1-15, and 1-20, a mobility management entity (MME) 1-25, and a serving-gateway (S-GW) 1-30. A user equipment (hereinafter referred to as "UE" or "terminal") 1-35 accesses an external network through the ENBs 1-05 to 1-20 and the S-GW 1-30.

In FIG. 1, the ENBs 1-05 to 1-20 correspond to existing node Bs of a UMTS system. The ENB is connected to the UE 1-35 on a radio channel, and plays a more complicated role than that of the existing node B. In the LTE system, since all user traffics including a real-time service, such as a voice over IP (VoIP) through an Internet protocol, are serviced on shared channels, entities that perform scheduling through gathering of state information, such as a buffer state, an available transmission power state, and a channel state of UEs, are necessary, and the ENBs 1-05 to 1-20 take charge of this. In general, one ENB controls a plurality of cells. For example, in order to implement a transmission speed of 100 Mbps, the LTE system uses, for example, orthogonal frequency division multiplexing (hereinafter, referred to as "OFDM") as a radio access technology in a bandwidth of 20 MHz. Further, the LTE system adopts an adaptive modulation & coding (hereinafter, referred to as "AMC") scheme that determines a modulation scheme and a channel coding rate to match the channel state of the UE. The S-GW 1-30 is an entity that provides a data bearer, and generates or removes the data bearer under the control of the MME 1-25. The MME is an entity that takes charge of not only a mobility management function for the UE but also various kinds of control functions, and is connected to the plurality of base stations.

Figure 2:
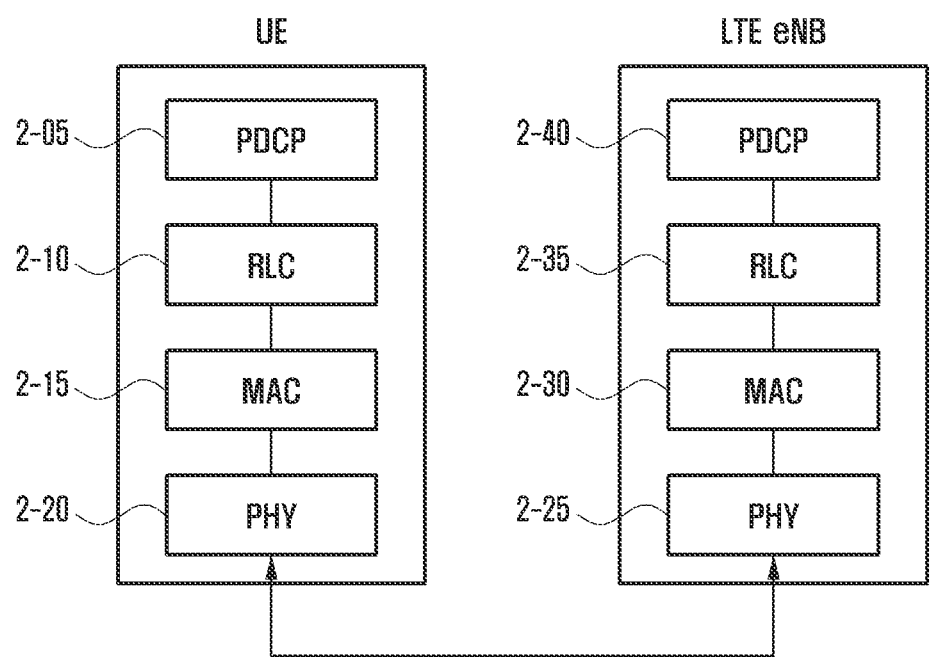
FIG. 2 is a diagram illustrating a radio protocol structure in an LTE system according to an embodiment of the disclosure.

FIG. 2 is a diagram illustrating a radio protocol structure of an LTE system according to an embodiment of the disclosure.

With reference to FIG. 2, in a UE or an ENB, a radio protocol of an LTE system is composed of a packet data convergence protocol (PDCP) 2-05 or 2-40, a radio link control (RLC) 2-10 or 2-35, and a medium access control (MAC) 2-15 or 2-30. The packet data convergence protocol (PDCP) 2-05 or 2-40 may take charge of IP header compression/decompression operations. The main functions of the PDCP are summarized as follows.

Header compression and decompression: ROHC only

Transfer of user data

In-sequence delivery of upper layer PDUs at PDCP re-establishment procedure for RLC AM For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink A radio link control (hereinafter, referred to as "RLC") 2-10 or 2-35 performs an ARQ operation by reconfiguring a PDCP packet data unit (PDCP PDU) with a suitable size. Main functions of the RLC are summarized as follows.

Transfer of upper layer PDUs

Error correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 2-15 or 2-30 is connected to several RLC layer devices constituted in one UE, and performs multiplexing of RLC PDUs into a MAC PDU and demultiplexing of the RLC PDUs from the MAC PDU. The main functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding A physical layer PHY 2-20 or 2-25 performs channel coding and modulation of upper layer data, and makes and transmits OFDM symbols on a radio channel, or performs demodulation and channel decoding of the OFDM symbols received on the radio channel and transfers the OFDM symbols to an upper layer.

Figure 3:
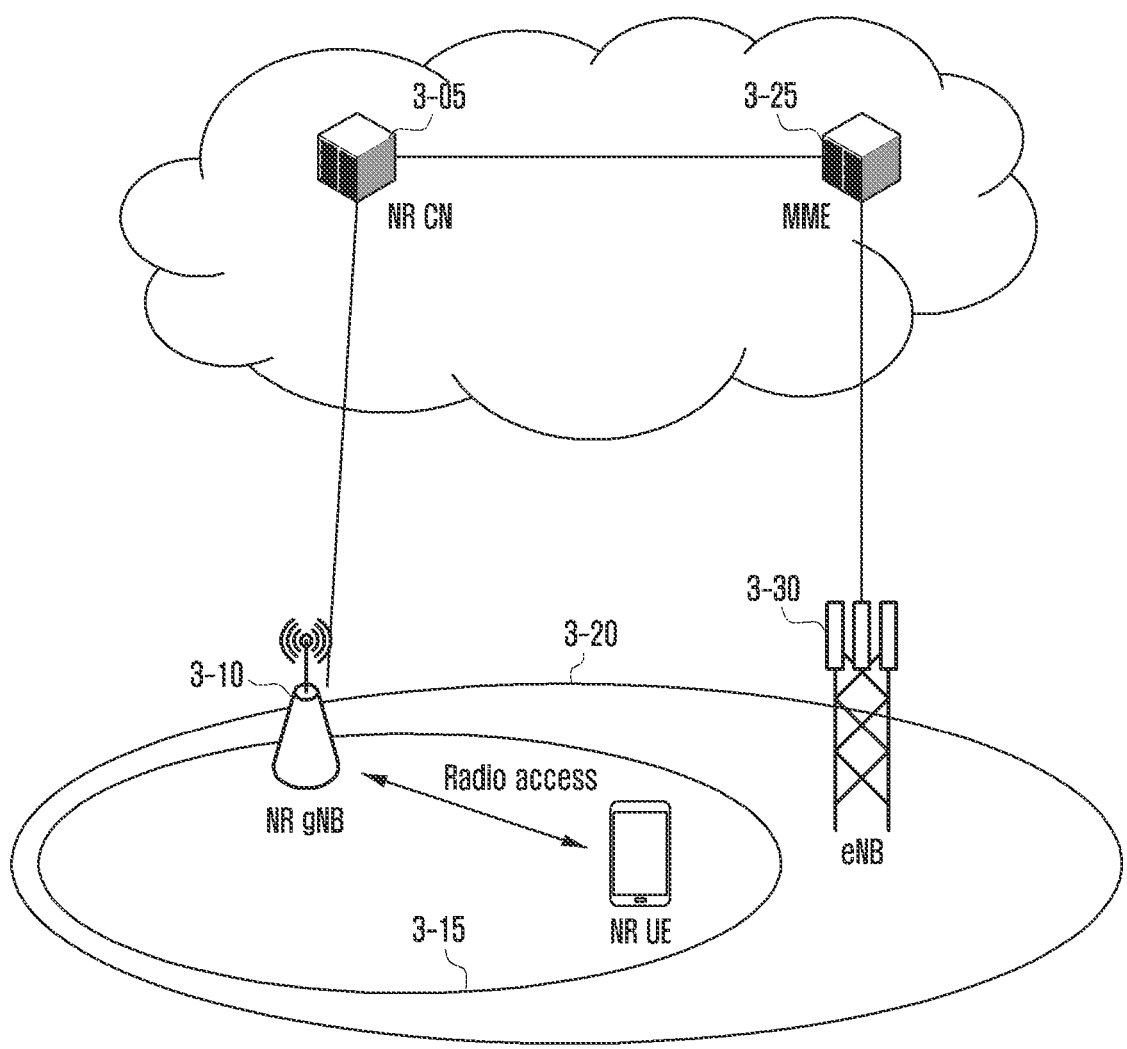
FIG. 3 is a diagram illustrating the structure of a next generation mobile communication system according to an embodiment of the disclosure.

FIG. 3 is a diagram illustrating the structure of a next generation mobile communication system according to an embodiment of the disclosure.

With reference to FIG. 3, as illustrated, a radio access network of a next generation mobile communication system (hereinafter, NR or 5G) may be composed of a new radio node B (hereinafter, NR gNB or NR base station) 3-10, and a new radio core network (NR CN) 3-05. A new radio user equipment (hereinafter, NR UE or UE) 3-15 accesses an external network through the NR gNB 3-10 and the NR CN 3-05.

In FIG. 3, the NR gNB 3-10 corresponds to an eNB of the existing LTE system. The NR gNB 3-10 is connected to the NR UE 3-15 on a radio channel, and can provide a more superior service than the service of the existing Node B. In the next generation mobile communication system, all user traffics are serviced on shared channels, and thus there is a need for a device that performs scheduling through consolidation of state information, such as a buffer state, an available transmission power state, and a channel state of UEs, and the NR gNB 3-10 takes charge of this. In general, one NR gNB controls a plurality of cells. In order to implement ultrahigh-speed data transmission as compared with that of the existing LTE, a bandwidth that is equal to or higher than the existing maximum bandwidth may be applied, and a beamforming technology may be additionally grafted in consideration of the orthogonal frequency division multiplexing (hereinafter, referred to as "OFDM") as the radio access technology. Further, the NR gNB 3-10 adopts an adaptive modulation & coding (hereinafter, referred to as "AMC") scheme that determines the modulation scheme and the channel coding rate to match the channel state of the UE. The NR CN 3-05 performs functions of mobility support, bearer setup, and QoS setup. The NR CN is a device that takes charge of not only a mobility management function for the UE but also various kinds of control functions, and is connected to a plurality of base stations. Further, the next generation mobile communication system may interwork with the existing LTE system, and the NR CN is connected to the MME 3-25 through a network interface. The MME is connected to the eNB 3-30 that is the existing base station.

Figure 4:
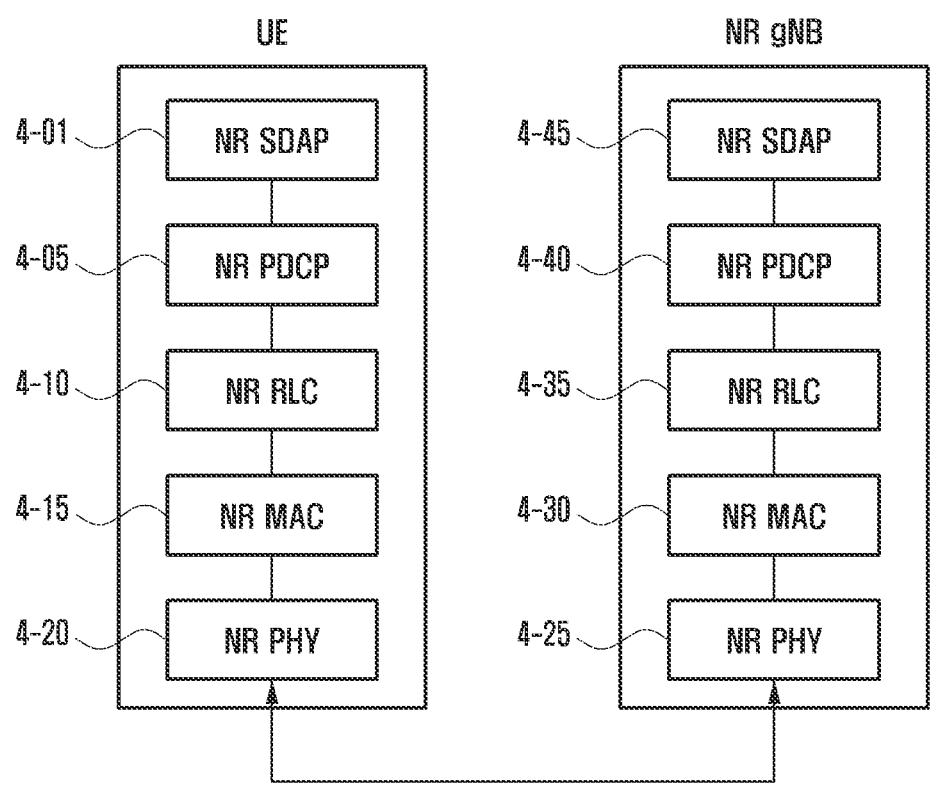
FIG. 4 is a diagram illustrating a radio protocol structure of a next generation mobile communication system according to an embodiment of the disclosure.

FIG. 4 is a diagram illustrating a radio protocol structure of a next generation mobile communication system according to an embodiment of the disclosure.

FIG. 4 is a diagram illustrating the radio protocol structure of the next generation mobile communication system to which the disclosure is applicable.

With reference to FIG. 4, in the UE or NR base station, the radio protocol of the next generation mobile communication system is composed of an NR SDAP 4-01 or 4-45, an NR PDCP 4-05 or 4-40, an NR RLC 4-10 or 4-35, and an NR MAC 4-15 or 4-30.

The main functions of the NR SDAP 4-01 or 4-45 may include some of the following functions.
- Transfer of user plane data
- Mapping between a QoS flow and a DRB for both DL and UL
- Marking QoS flow ID in both DL and UL packets
- Reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through a radio resource control (RRC) message. If the SDAP header is configured, the UE may indicate that the UE can update or reconfigure mapping information on the uplink and downlink QoS flow and the data bearer through a NAS QoS reflective configuration 1-bit indicator (NAS reflective QoS) and an AS QoS reflective configuration 1-bit indicator (AS reflective QoS) of the SDAP header. The SDAP header may include QoS flow ID information representing the QoS. The QoS information may be used as a data processing priority for supporting a smooth service and scheduling information.

The main functions of the NR PDCP 4-05 or 4-40 may include some of the following functions.
- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in an uplink As described above, reordering of the NR PDCP device may mean reordering of PDCP PDUs received from a lower layer based on PDCP sequence numbers (SNs), and may include transferring of data to an upper layer in the order of reordering. Further, the reordering may include immediate transferring of the data without considering the order, recording of lost PDCP PDUs through reordering, reporting of the status for the lost PDCP PDUs to a transmission side, and requesting for retransmission for the lost PDCP PDUs.

The main functions of the NR RLC 4-10 or 4-35 may include some of the following functions.
- Transfer of upper layer PDUs
- In-sequence delivery of upper layer PDUs
- Out-of-sequence delivery of upper layer PDUs
- Error correction through an ARQ
- Concatenation, segmentation, and reassembly of RLC SDUs
- Re-segmentation of RLC data PDUs
- Reordering of RLC data PDUs
- Duplicate detection
- Protocol error detection
- RLC SDU discard
- RLC reestablishment As described above, the in-sequence delivery of the NR RLC device may mean the in-sequence delivery of RLC SDUs received from a lower layer to an upper layer, and in case that one original RLC SDU is segmented into several RLC SDUs to be received, the in-sequence delivery of the NR RLC device may include reassembly and delivery of the RLC SDUs and reordering of the received RLC PDUs based on an RLC sequence number (SN) or a PDCP sequence number (SN). The in-sequence delivery of the NR RLC device may include recording of lost RLC PDUs through reordering, status report for the lost RLC PDUs to the transmission side, and retransmission request for the lost RLC PDUs. The in-sequence delivery of the NR RLC device may include in-sequence delivery of only RLC SDUs just before the lost RLC SDU to an upper layer if there is the lost RLC SDU, in-sequence delivery of all RLC SDUs received before a specific timer starts its operation to an upper layer if a specific timer has expired although there is the lost RLC SDU, or in-sequence delivery of all RLC SDUs received up to now to an upper layer if the specific timer has expired although there is the lost RLC SDU. Further, the NR RLC device may process the RLC PDUs in the order of their reception (in the order of arrival, regardless of the order of a serial number or sequence number), and may transfer the processed RLC PDUs to the PDCP device in an out-of-sequence delivery manner, and in case of receiving segments, the NR RLC device may receive the segments stored in a buffer or to be received later, reconfigure and process them as one complete RLC PDU, and then transfer the reconfigured RLC PDU to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device may mean a function of transferring the RLC SDUs received from a lower layer directly to an upper layer regardless of their order, and if one original RLC SDU is segmented into several RLC SDUs to be received, the out-of-sequence delivery of the NR RLC device may include reassembly and delivery of the RLC SDUs. Further, the out-of-sequence delivery of the NR RLC device may include functions of storing and ordering the RLC SNs or PDCP SNs of the received RLC PDUs and recording of the lost RLC PDUs.

The NR MAC 4-15 or 4-30 may be connected to several NR RLC layer devices constituted in one UE, and the main functions of the NR MAC may include some of the following functions.
- Mapping between logical channels and transport channels
- Multiplexing/demultiplexing of MAC SDUs
- Scheduling information reporting
- HARQ function (error correction through HARQ)
- Priority handling between logical channels of one UE
- Priority handling between UEs by means of dynamic scheduling
- MBMS service identification
- Transport format selection
- Padding The NR PHY layer 4-20 or 4-25 may perform channel coding and modulation of upper layer data to make and transmit OFDM symbols on a radio channel, or may perform demodulation and channel decoding of the OFDM symbols received on the radio channel to transfer the demodulated and channel-decoded symbols to an upper layer.

Figure 5:
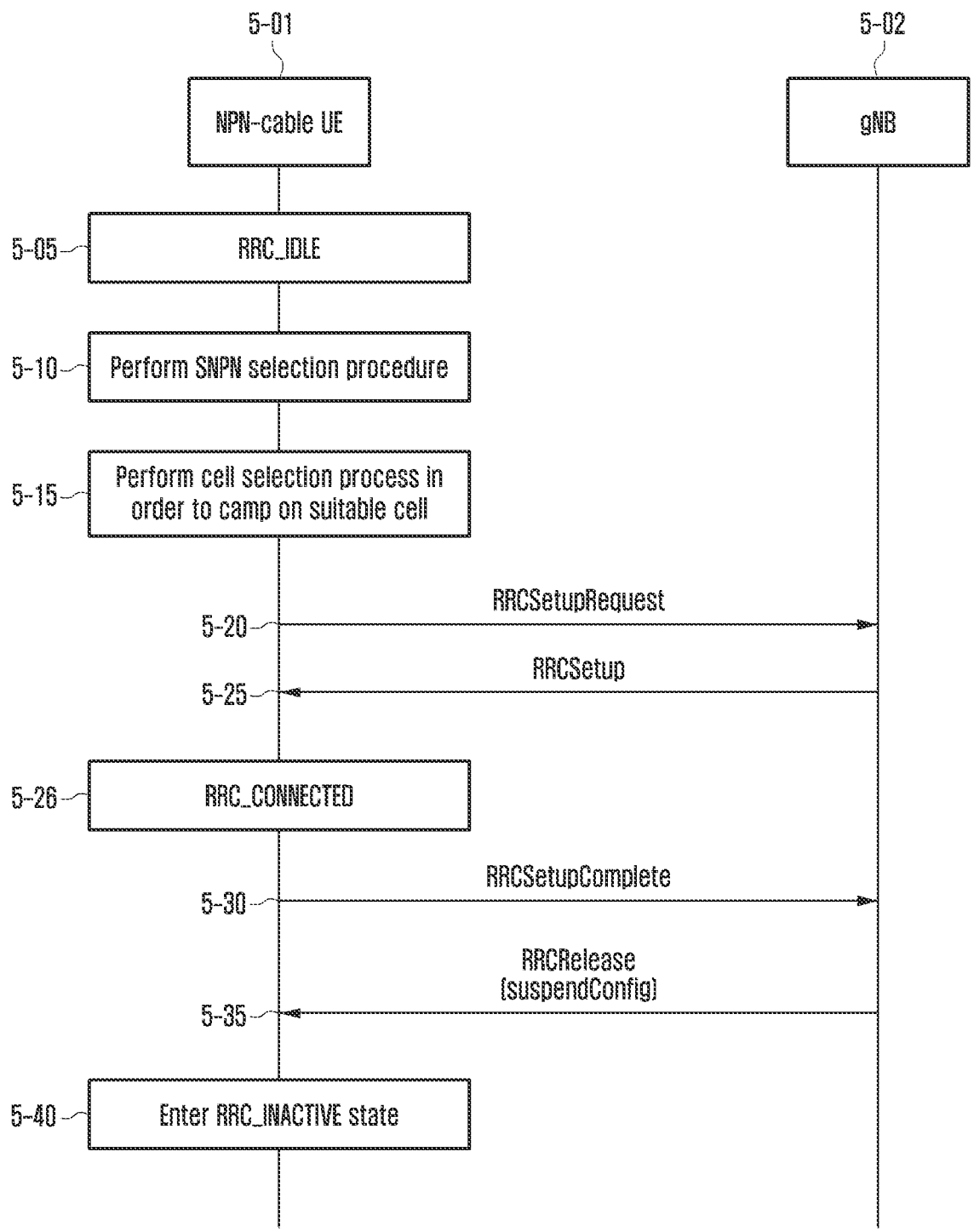
FIG. 5 is a diagram illustrating a process of transitioning a UE that operates in a stand-alone non-public network (SNPN) access mode from an RRC connected (RRC CONNECTED) mode to an RRC inactive (RRC_INACTIVE) state in a next generation mobile communication system according to an embodiment of the disclosure.

FIG. 5 is a diagram illustrating a process of transitioning a UE that operates in a stand-alone non-public network (SNPN) access mode from an RRC connected (RRC CONNECTED) state to an RRC inactive (RRC_INACTIVE) state in a next generation mobile communication system according to an embodiment of the disclosure.

According to an embodiment of the disclosure, the SNPN may mean a network that is operated by an NPN operator, and does not rely on network functions provided by a public land mobile network (PLMN). The SNPN may be identified from a PLMN ID by a network identifier (NID), and the PLMN ID and NID information may be broadcasted through SIB1.

Accordingly, when the UE is set to operate in the SNPN access mode (hereinafter, it may be called an SNPN AM or SNPN access state), the UE may not perform a normal PLMN selection process, but may perform an SNPN selection process. That is, when the UE is set to operate in the SNPN access mode, the UE may only select and register the SNPNs.

With reference to FIG. 5, an NPN-capable UE 5-01 may be in an RRC idle (RRC_IDLE) state (5-05).

In step 5-10, the UE 5-01 may perform the SNPN selection procedure. As an example, the UE may scan all RF channels in NR bands according to its capabilities to find available SNPNs. Further, on each carrier, the UE may search for the strongest call, and read its system information in order to find out which SNPN(s) the cell belongs to, and select an SNPN.

In step 5-15, the UE 5-01 that is set to operate as an SNPN AM may perform the cell selection process. Specifically, the UE may perform the cell selection process in order to select or camp on a suitable cell belonging to the SNPN selected in step; 5-10. The UE that is set to operate in the SNPN access mode may select or camp on the suitable cell in case that at least one of the following conditions is satisfied.

Condition 1: In case that the cell is a part of either the selected SNPN or the registered SNPN of the UE Condition 2: In case of the cell that satisfies cell selection criteria The cell selection criteria mean Mathematical expression 1 below.

<Mathematical expression 1>

$Srxlev > 0$ AND $Squal > 0$ where:

$Srxlev = Qrxlevmeas - (Qrxlevmin + Qrxlevminoffset) - Pcompensation - Qoffsettemp$ $Squal = Qqualmeas - (Qqualmin + Qqualminoffset) - Qoffsettemp$ Parameters being used in the Mathematical expression 1 may be defined with reference to the 3GPP standard document "38.304: User Equipment (UE) procedures in idle mode", and the parameters may be included in the system information (e.g., SIB1 and SIB2) being broadcasted in the cell. Hereinafter, the same applies to embodiments of the disclosure to which the Mathematical expression 1 is applied.

Condition 3: In case that the cell is not barred according to information that is most recently provided from a non-access stratum (NAS) device, and the cell is a part of at least one tracking area (hereinafter, TA) that is not a part of a list of "forbidden tracking areas", which belongs to either the selected SNPN or the registered SNPN of the UE.

As an example, a case that the cell is prohibited may mean a case that a "cellBarred" indicator included in at least an MIB is set to be "barred", or a Rel-16 "cellReservedForOperatorUse" indicator included in SIB1 is set to be "reserved", or a Rel-16 "cellReservedForFutureUse" indicator is set to be "reserved".

The UE 5-01 that is set to operate as the SNPN AM may perform an RRC connection configuration procedure with a base station 5-02. Specifically, the UE may transmit an RRCSetupRequest message to the base station (5-20), may receive an RRCSetup message from the base station in response to this (5-25), and may be transitioned to an RRC connection mode (5-30). Further, the UE may transmit an RRCSetupComplete message to the base station (5-30).

In step 5-35, the base station 5-02 may transmit an RRCRelease message including suspension configuration information (suspendConfig) in order to transition the UE 5-01 in the RRC connected mode, which operates as the SNPN AM, to the RRC inactive mode (RRC_INACTIVE). In the suspension configuration information (suspendConfig), RAN notification area configuration information (ran-NotificationAreaInfo) may be included. Specifically, the ran-NotificationAreaInfo may be set as one of a cell list (cellList) and a RAN area code list, and detailed explanation related to the configuration information is as follows.

```
RAN-NotificationAreaInfo ::=    CHOICE {
    cellList                        PLMN-RAN-AreaCellList,
    ran-AreaConfigList              PLMN-RAN-AreaConfigList,
    ...
}
PLMN-RAN-AreaCellList ::=       SEQUENCE (SIZE (1.. maxPLMNIdentities)) OF PLMN-RAN-AreaCell
PLMN-RAN-AreaCell ::=           SEQUENCE {
    plmn-Identity                       PLMN-Identity
OPTIONAL,    -- Need S
    ran-AreaCells                   SEQUENCE (SIZE (1..32)) OF CellIdentity
}
PLMN-RAN-AreaConfigList ::=     SEQUENCE (SIZE (1..maxPLMNIdentities)) OF PLMN-RAN-AreaConfig
PLMN-RAN-AreaConfig ::=         SEQUENCE {
    plmn-Identity                       PLMN-Identity
OPTIONAL,    -- Need S
    ran-Area                        SEQUENCE (SIZE (1..16)) OF RAN-AreaConfig
}
RAN-AreaConfig ::=              SEQUENCE {
    trackingAreaCode                TrackingAreaCode,
    ran-AreaCodeList                    SEQUENCE (SIZE (1..32)) OF RAN-AreaCode
OPTIONAL    -- Need R
}
```

| RAN-NotificationAreaInfo field descriptions |
| --- |
| cellList |
| A list of cells configured as RAN area |
| ran-AreaConfigList |
| A list of RAN area codes or RA code(s) as RAN area. |

| PLMN-RAN-AreaConfig field descriptions |
| --- |
| plmn-Identity |
| PLMN Identity to which the cells in ran-Area belong. If the field is absent the UE uses the ID of the registered PLMN. |
| ran-AreaCodeList |
| The total number of RAN-AreaCodes of all PLMNs does not exceed 32. |
| ran-Area |
| Indicates whether TA code(s) or RAN area code(s) are used for the RAN notification area. The network uses only TA code(s) or both TA code(s) and RAN area code(s) to configure a UE. The total number of TACs across all PLMNs does not exceed 16. |

| PLMN-RAN-AreaCell field descriptions |
| --- |
| plmn-Identity |
| PLMN Identity to which the cells in ran-AreaCells belong. If the field is absent the UE uses the ID of the registered PLMN. |
| ran-AreaCells |
| The total number of cells of all PLMNs does not exceed 32. |

In step 5-40, the UE 5-01 that operates as the SNPN AM may apply the RRCRelease message received in step 5-35, may be transitioned to the RRC inactive mode, and may perform a cell selection or cell reselection process.

Figure 6:
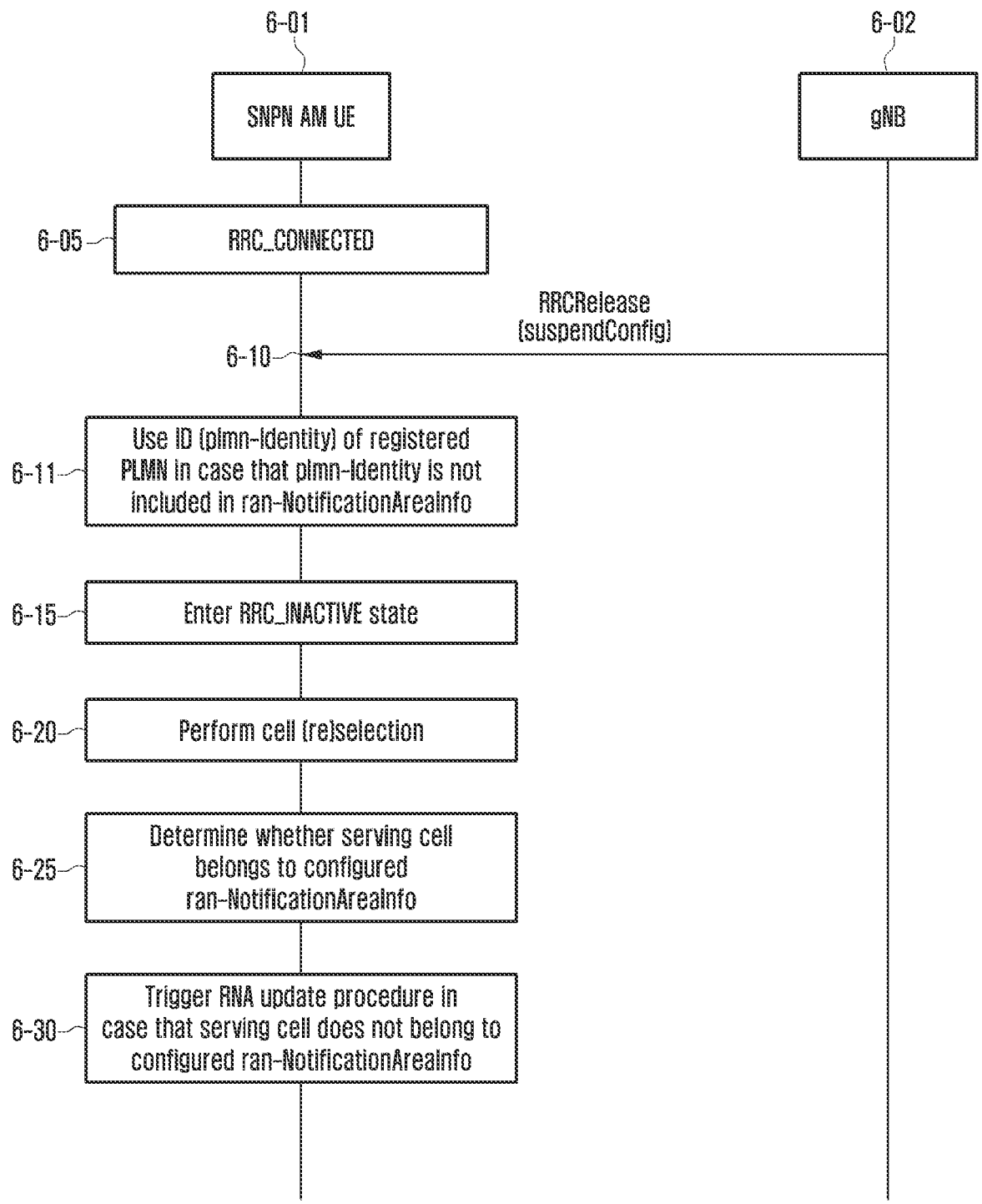
FIG. 6 is a diagram illustrating a process in which a UE in an RRC inactive state, operating in an SNPN access mode, performs a RAN notification area update (RNAU) in a next generation mobile communication system according to an embodiment of the disclosure.

FIG. 6 is a diagram illustrating a process in which a UE in an RRC inactive mode, operating in an SNPN access mode, performs a RAN notification area update (RNAU) in a next generation mobile communication system according to an embodiment of the disclosure.

With reference to FIG. 6, a UE 6-01 that operates in an SNPN access mode may configure an RRC connection with a base station 6-02, and may be in an RRC connected state (6-05).

In step 6-10, the base station 6-02 may transmit an RRCRelease message including suspension configuration information (suspendConfig) in order to transition the UE 6-01 to the RRC inactive (RRC_INACTIVE) state. In the suspension configuration information, RAN notification area configuration information (ran-NotificationAreaInfo) may be included. Specifically, the base station may set the ran-NotificationAreaInfo as one of a cellList and a ran-AreaConfigList with respect to the UE as follows.

cellList: The cellList may be composed of one or a plurality of PLMN-Area-Cells, and each PLMN-Area-Cell may be composed of a plmn-Identity and one or a plurality of cellIdentities. If the base station 6-02 does not include the plmn-Identity in a specific PLMN-Area-Cell, and sets only one or a plurality of cellIdentities, the UE 6-01 may apply the specific PLMN-Area-Cell by using the plmn-Identity of the specific PLMN-Area-Cell as the plmn-Identity of the registered PLMN (hereinafter, may be referred to as "RPLMN") (6-11). For reference, the UE that operates as the SNPN AM does not have equivalent SNPNs, and even if the base station sets the cellList with a plurality of PLMN-Area-Cells, the UE may configure one or a plurality of cellIdentities belonging to one plmn-Identity.

ran-areaConfigList: The ran-areaConfigList may be composed of one or a plurality of PLMN-RAN-AreaConfigs, and each PLMN-RAN-AreaConfig may be composed of a plmn-Identity and one or a plurality of RAN-AreaConfigs. Each RAN-AreaConfig may be composed of a trackingArea Code and one or a plurality of RAN-AreaCodes. If the base station 6-02 does not include the plmn-Identity in a specific PLMN-RAN-AreaConfig, and sets only one or a plurality of RAN-AreaConfigs, the UE 6-01 may apply the specific PLMN-RAN-AreaConfig by using the plmn-Identity of the specific PLMN-Area-Cell as the plmn-Identity of the registered PLMN (6-11). For reference, the UE that operates as the SNPN AM does not have equivalent SNPNs, and even if the base station sets the ran-areaConfigList with a plurality of PLMN-RAN-AreaConfigs, the UE may configure one or a plurality of RAN-AreaConfigs belonging to one plmn-Identity.

In step 6-15, the UE 6-01 that operate in the SNPN access mode may apply the RRCRelease message received in step 6-10, and may be transitioned to the RRC inactive mode.

In step 6-20, the UE 6-01 in the RRC inactive mode, which operates in the SNPN access mode, may receive the system information (e.g., SIB1), and may perform the cell selection or cell reselection process. The cell selected or reselected by the UE may be called a serving cell.

In step 6-25, the UE 6-01 in the RRC inactive mode, which operates in the SNPN access mode, may determine whether the serving cell belongs to the ran-NotificationAreaInfo received in step 6-10 through the SIB1 message. In case that the plmn-Identity is not included in the cellList or the ran-areaConfigList of the ran-NotificationAreaInfo, the UE may determine that the cell does not belong to the ran-NotificationAreaInfo even if the serving cell broadcasts the selected SNPN or registered SNPN information of the UE through the SIB1. Since the UE that operates in the SNPN access mode does not select the PLMN, not only there is not the registered PLMN, but also the UE does not maintain the information on the PLMN, but maintain the information on the SNPN.

If the UE determines that the serving cell does not belong to the ran-NotificationAreaInfo in step 6-25, the UE may start an RNA update procedure in step 6-30. That is, in step 6-35, the UE may store the resumeCause having been set through the ma-Update in an RRCResumeRequest or RRCResumeRequest 1 message, and may transmit the RRCResumeRequest or RRCResumeRequest 1 message to the base station.

In response to this, the serving cell may transmit the RRCRelease message containing the suspension configuration information (suspendConfig) to the UE.

In an embodiment of the disclosure, even if the serving cell broadcasts the SNPN selected or registered by the UE through the SIB1, the UE is featured to determine that the cell does not belong to the ran-NotificationAreaInfo and thus to start the RNA update procedure. This is because the UE that operates in the SNPN access mode does not select or register the PLMN.

Figure 7:
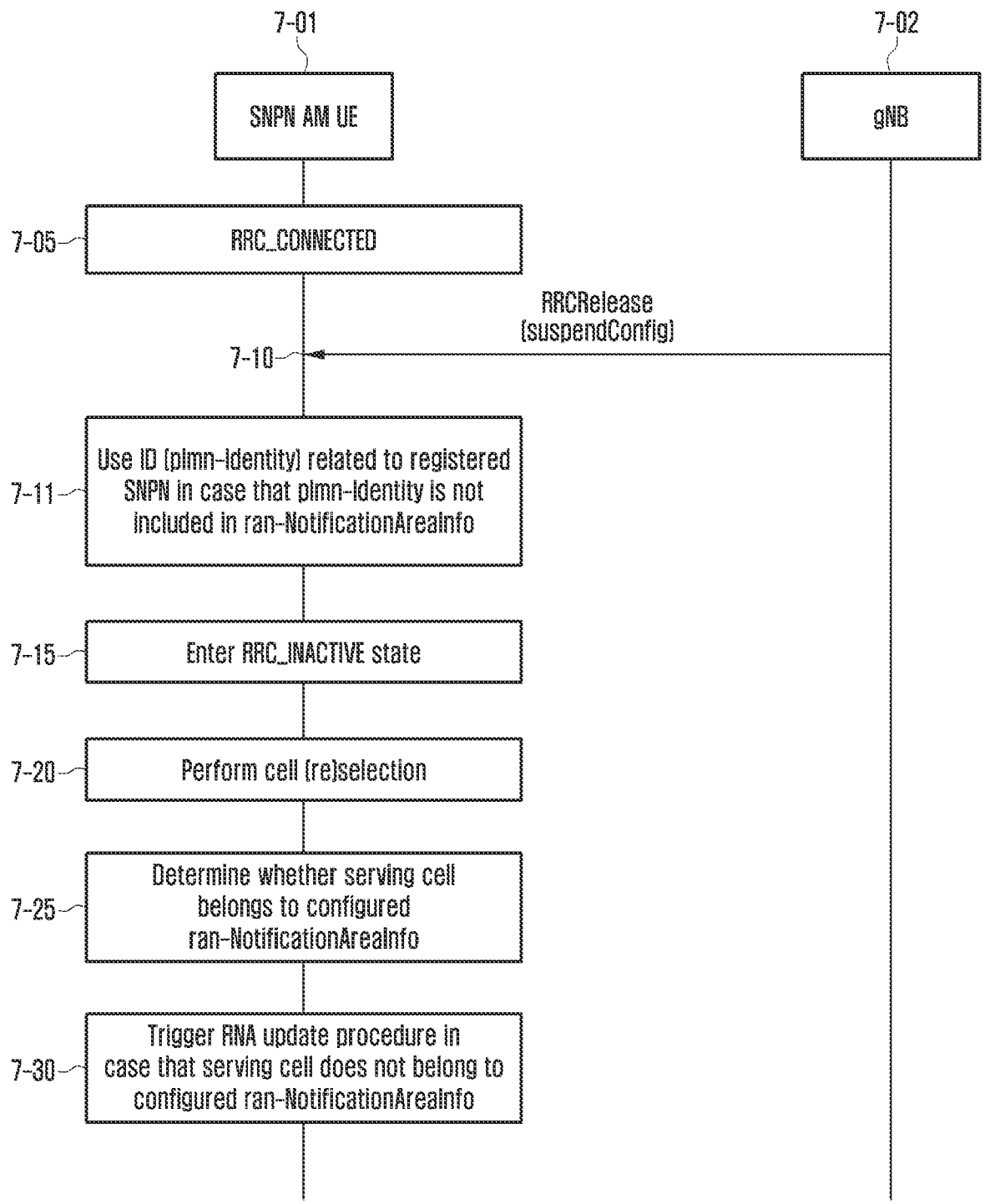
FIG. 7 is a diagram illustrating a process in which a UE in an RRC inactive mode, operating in an SNPN access mode, performs an RNAU in a next generation mobile communication system according to an embodiment of the disclosure.

FIG. 7 is a diagram illustrating a process in which a UE in an RRC inactive mode, operating in an SNPN access mode, performs an RNAU in a next generation mobile communication system according to an embodiment of the disclosure.

With reference to FIG. 7, a UE 7-01 that operates in an SNPN access mode may configure an RRC connection with a base station 7-02, and may be in an RRC connected state (7-05).

In step 7-10, the base station 7-02 may transmit an RRCRelease message including suspension configuration information (suspendConfig) in order to transition the UE 7-01 to the RRC inactive (RRC_INACTIVE) state. In the suspension configuration information, RAN notification area configuration information (ran-NotificationAreaInfo) may be included. Specifically, the base station may set the ran-NotificationAreaInfo as one of a cellList and a ran-AreaConfigList with respect to the UE as follows.

cellList: The cellList may be composed of one or a plurality of PLMN-Area-Cells, and each PLMN-Area-Cell may be composed of a plmn-Identity and one or a plurality of cellIdentities. If the base station 7-02 does not include the plmn-Identity in a specific PLMN-Area-Cell, and sets only one or a plurality of cellIdentities, the UE 7-01 may apply the specific PLMN-Area-Cell by using the plmn-Identity of the specific PLMN-Area-Cell as the plmn-Identity which is mapped/belongs to the registered SNPN (7-11) (registered SNPN=plmn-Identity 1+ NID 1, then use plmn-Identity 1).

In addition, the base station according to an embodiment of the disclosure may set an NID-List to each PLMN-Area-Cell. For example, the NID-List may be set for each PLMN, and the NID-List for each PLMN may be set in the same order as the PLMN-RAN-Area-CellList. If the base station 7-02 includes the plmn-Identity in the specific PLMN-Area-Cell, the UE 7-01 may apply the specific PLMN-Area-Cell by using the plmn-Identity of the specific PLMN-Area-Cell as the plmn-Identity which is mapped/belongs to the registered SNPN (7-11). For reference, the UE that operates as the SNPN AM does not have equivalent SNPNs, and even if the base station sets the cellList with a plurality of PLMN-Area-Cells, it may configure one or a plurality of cellIdentities belonging to one plmn-Identity.

ran-areaConfigList: The ran-areaConfigList may be composed of one or a plurality of PLMN-RAN-AreaConfigs, and each PLMN-RAN-AreaConfig may be composed of a plmn-Identity and one or a plurality of RAN-AreaConfigs. Each RAN-AreaConfig may be composed of a tracking Area Code and one or a plurality of RAN-AreaCodes. If the base station 7-02 does not include the plmn-Identity in a specific PLMN-RAN-AreaConfig, and sets only one or a plurality of RAN-AreaConfigs, the UE 7-01 according to an embodiment of the disclosure may apply the specific PLMN-RAN-AreaConfig by using the plmn-Identity of the specific PLMN-RAN-AreaConfig as the plmn-Identity which is mapped/belongs to the registered SNPN (7-11) (registered SNPN=plmn-Identity 1+NID 1, then use plmn-Identity 1).

In addition, the base station according to an embodiment of the disclosure may set an NID-List to each PLMN-RAN-AreaConfig. For example, the NID-List may be set for each PLMN, and the NID-List for each PLMN may be set in the same order as the PLMN-RAN-AreaConfigList. If the base station 7-02 includes the plmn-Identity in the specific PLMN-RAN-AreaConfig, the UE 7-01 may apply the specific PLMN-RAN-AreaConfig by using the plmn-Identity of the specific PLMN-RAN-AreaConfig as the plmn-Identity which is mapped/belongs to the registered SNPN (7-11). For reference, the UE that operates as the SNPN AM does not have equivalent SNPNs, and even if the base station sets the ran-areaConfigList with a plurality of PLMN-RAN-AreaConfig, it may configure one or a plurality of RAN-AreaConfigs belonging to one plmn-Identity.

In step 7-15, the UE 7-01 that operate in the SNPN access mode may apply the RRCRelease message received in step 7-10, and may be transitioned to the RRC inactive mode.

In step 7-20, the UE 7-01 in the RRC inactive mode, which operates in the SNPN access mode, may receive the system information (e.g., SIB1), and may perform the cell selection or cell reselection process. The cell selected or reselected by the UE may be called a serving cell.

In step 7-25, the UE 7-01 in the RRC inactive mode, which operates in the SNPN access mode, may determine whether the serving cell belongs to the ran-NotificationAreaInfo received in step 7-10 through the SIB1 message. Unlike the above-described embodiment, in case that the plmn-Identity is not included in the cellList or the ran-areaConfigList of the ran-NotificationAreaInfo, the UE uses the plmn-Identity as the plmn-Identity which is mapped/belongs to the registered SNPN, and thus may determine that the serving cell belongs to the ran-NotificationAreaInfo when the serving cell broadcasts the selected SNPN or registered SNPN information of the UE through the SIB1.

If the UE determines that the serving cell does not belong to the ran-NotificationAreaInfo in step 7-25, the UE may start an RNA update procedure in step 7-30. That is, in step 7-35, the UE may store the resumeCause having been set through the ma-Update in an RRCResumeRequest or RRCResumeRequest 1 message, and may transmit the RRCResumeRequest or RRCResumeRequest 1 message to the base station.

In response to this, the serving cell may transmit the RRCRelease message containing the suspension configuration information (suspendConfig) to the UE.

In an embodiment of the disclosure, in case that the base station sets the ran-NotificationAreaInfo to the UE that operates in the SNPN access mode, and the plmn-Identity is not included in the ran-NotificationAreaInfo, the UE is featured to apply the ran-NotificationAreaInfo by using the plmn-Identity that belongs to the registered SNPN. In addition, in an embodiment of the disclosure, if the base station sets the ran-NotificationAreaInfo to the UE that operates in the SNPN access mode, it may set the NID-List.

Figure 8:
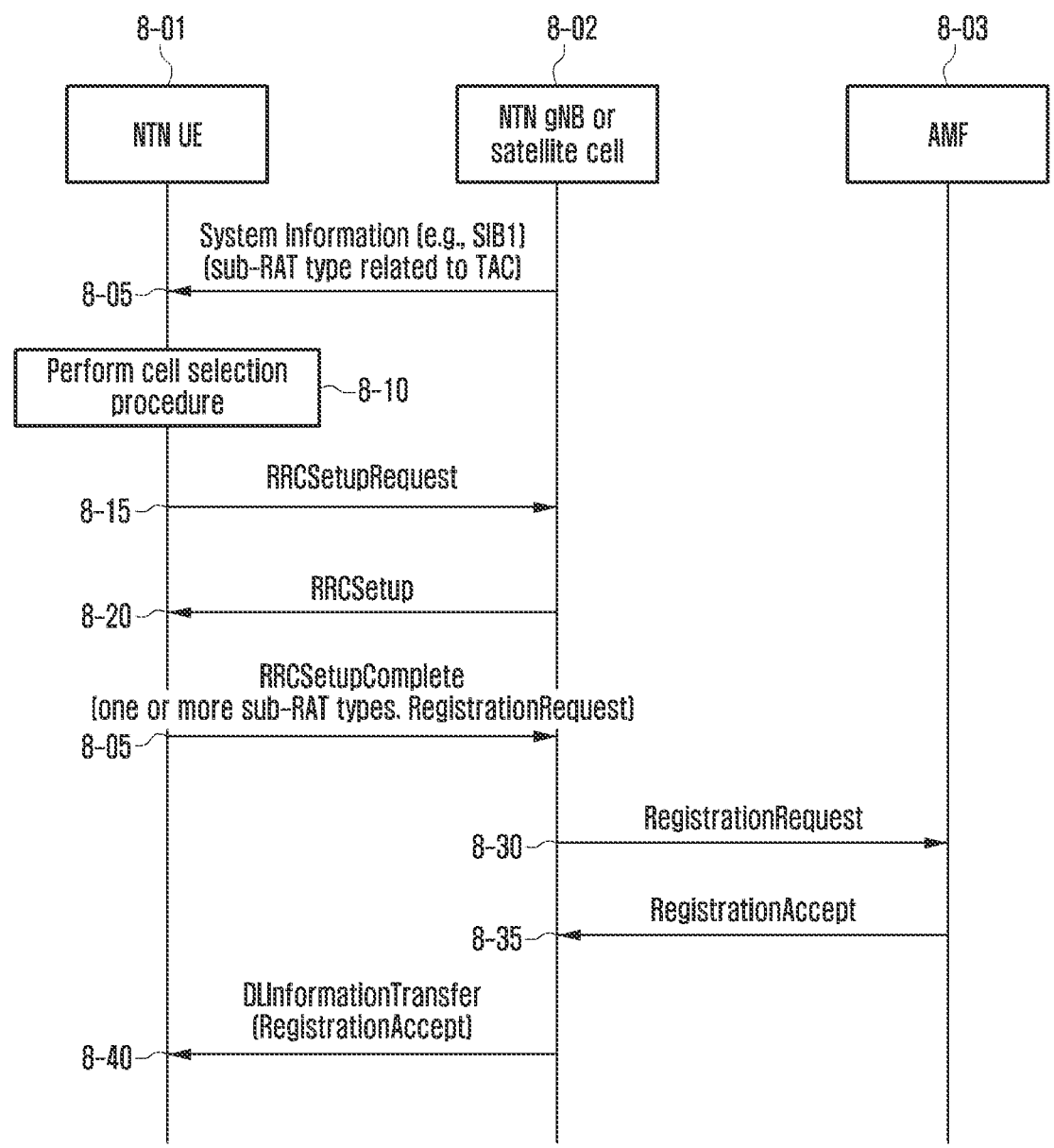
FIG. 8 is a diagram illustrating a process in which a non-terrestrial network (NTN) UE performs a registration procedure update (or tracking area update) with a satellite cell/base station according to an embodiment of the disclosure.

FIG. 8 is a diagram illustrating a process in which a non-terrestrial network (NTN) UE performs a registration procedure update (or tracking area update) with a satellite cell/base station according to an embodiment of the disclosure.

The UE supporting the NTN and the satellite cell/base station may have the following features.

NTN UE: The UE supporting the NTN may have a global navigation satellite system (GNSS) ability. The UE that drives the GNSS may grasp its own location. As an example, the UE that drives the GNSS may grasp its own location based on the geocentric coordinates. The NTN UE may support an access of one or a plurality of satellites among a geostationary earth orbit (GEO), a medium earth orbit (MEO), a low earth orbit (LEO), and OTHERSAT. In the disclosure, the GEO, MEO, LEO, or OTHERSAT is called a sub-RAT type.

Satellite cell/base station: This may mean a cell that supports at least one of the GEO, MEO, LEO, and OTHERSAT. The cell may broadcast which sub-RAT type(s) the cell supports through the system information.

With reference to FIG. 8, an NTN gNB or a satellite cell 8-02 may broadcast the system information for an NTN UE 8-01 (8-05). The system information may include an indicator indicating support of the satellite access. Further, the system information may include information (i.e., sub-RAT type information) indicating any one of the GEO, MEO, LEO, and OTHERSAT. Specifically, the SIB1 may include a PLMN-Identity, TrackingAreaCode, RAN-AreaCode, CellIdentity, and sub-RAT type, or may include a PLMN-Identity, one or a plurality of TrackingAreaCodes, one or a pluraligty of RAN-AreaCodes, CellIdentities, or sub-RAT types, or may include one or a plurality of PLMN-Identities, one or a plurality of TrackingAreaCodes, one or a plurality of RAN-AreaCodes, CellIdentities, and one or a plurality of sub-RAT types (in this case, one or a plurality of sub-RAT types may be commonly applied to x PLMN-Identities and y TrackingAreaCodes, x>=y). In this case, x may mean the number of PLMN-identities of a PLMN-IdnetityList set through the SIB, and y may mean the number of TrackingAreaCodes set through the SIB. As an example, the SIB1 may have the following ASN.1 structure.

In step 8-30, the NTN gNB or the satellite cell 8-02 may transfer the RegistrationRequest message to an entity 8-03 (hereinafter, AMF) that performs an access and mobility management function AMF).

In step 8-35, the AMF 8-03 may transfer a RegistrationAccept message to the NTN gNB or the satellite cell 8-02. The RegistrationAccept message may include a TrackingAreaCode for each PLMN and sub-RAT type(s) mapped thereon (or tracking area and sub-RAT type(s) mapped thereon). Based on the corresponding information, the UE 8-01 may determine whether to perform registration area/tracking area update later. In addition, the RegistrationAccept message may include a forbidden tracking area for each PLMN, and may include sub-RAT type(s) mapped on the forbidden tracking area.

```
PLMN-IdentityInfoList ::=        SEQUENCE (SIZE (1..maxPLMN)) OF PLMN-
IdentityInfo
     PLMN-IdentityInfo ::=       SEQUENCE {
        plmn-IdentityList           SEQUENCE (SIZE (1..maxPLMN)) OF PLMN-
Identity,
        trackingAreaCode            TrackingAreaCode
OPTIONAL,   -- Need R
        ranac                       RAN-AreaCode
OPTIONAL,   -- Need R
        cellIdentity                CellIdentity,
        cellReservedForOperatorUse  ENUMERATED {reserved,notReserved},
        ...,
        [[
        iab-Support-r16             ENUMERATED {true}
OPTIONAL   -- Need S
        ]]
        ...,
        [[
        subRAT-Type                 ENUMERATED {LEO, MEO, GEO, OTHERSAT}
OPTIONAL
        ]]
}
```

In step 8-10, the NTN UE 8-01 may perform a cell selection process. As an example, the NTN UE 8-01 may receive an MIB and SIB1 being broadcasted by the NTN gNB or the satellite cell 8-02, and may perform the cell selection process. In the disclosure, the UE obtains the SIB1 being broadcasted by the satellite cell 8-02, and in case that the corresponding cell belongs to selected PLMN/Equivalent PLMN list/RPLMNN of the UE, but the sub-RAT type is not supported with respect to the PLMN-Identity, TrackingAreaCode, RAN-AreaCode, and CellIdentity included in the SIB1, the UE may bar the satellite cell 8-02. Further, the UE may perform an intra-frequency cell reselection process according to an intraFreqReselection indicator indicated by the In step 8-15, the UE 8-01 may transmit an RRCSetupRequest message to the NTN gNB or the satellite cell 8-02 for RRC connection setup.

In step 8-20, the NTN gNB or the satellite cell 8-02 may transmit an RRCSetup message to the UE 8-01.

In step 8-25, the UE 8-01 may transmit an RRCSetupComplete message to the NTN gNB or the satellite cell 8-02. The disclosure proposes that the RRCSetupComplete message that the UE 8-01 transmits to the NTN gNB or the satellite cell 8-02 includes one or a plurality of sub-RAT types supported by the UE. The one or a plurality of sub-RAT types may be included in the RRCSetupComplete message, or may be stored in a dedicated NAS message that is stored in the RRCSetupComplete message. The dedicated NAS message stored in the RRCSetupComplete message may include a registration request message.

In step 8-40, the NTN gNB or the satellite cell 8-02 may transmit a DLInformationTransfer message to the UE 8-01. The message may store a RegistrationAccept message.

The disclosure proposes to consider the sub-RAT type together when the NTN UE and the NTN gNB or the satellite cell may manage the registration area. For this, the system information may include the sub-RAT type, and when transmitting the registration request message or the RRCSetupComplete message, the NTN UE may include the sub-RAT type in the message to be transmitted to the NTN gNB or the satellite cell, and the AMF may allocate the tracking area/registration area to the NTN UE by designating together the sub-RAT type to the tracking area/registration area. Accordingly, the NTN UE may consider the sub-RAT type when performing the registration update.

Figure 9:
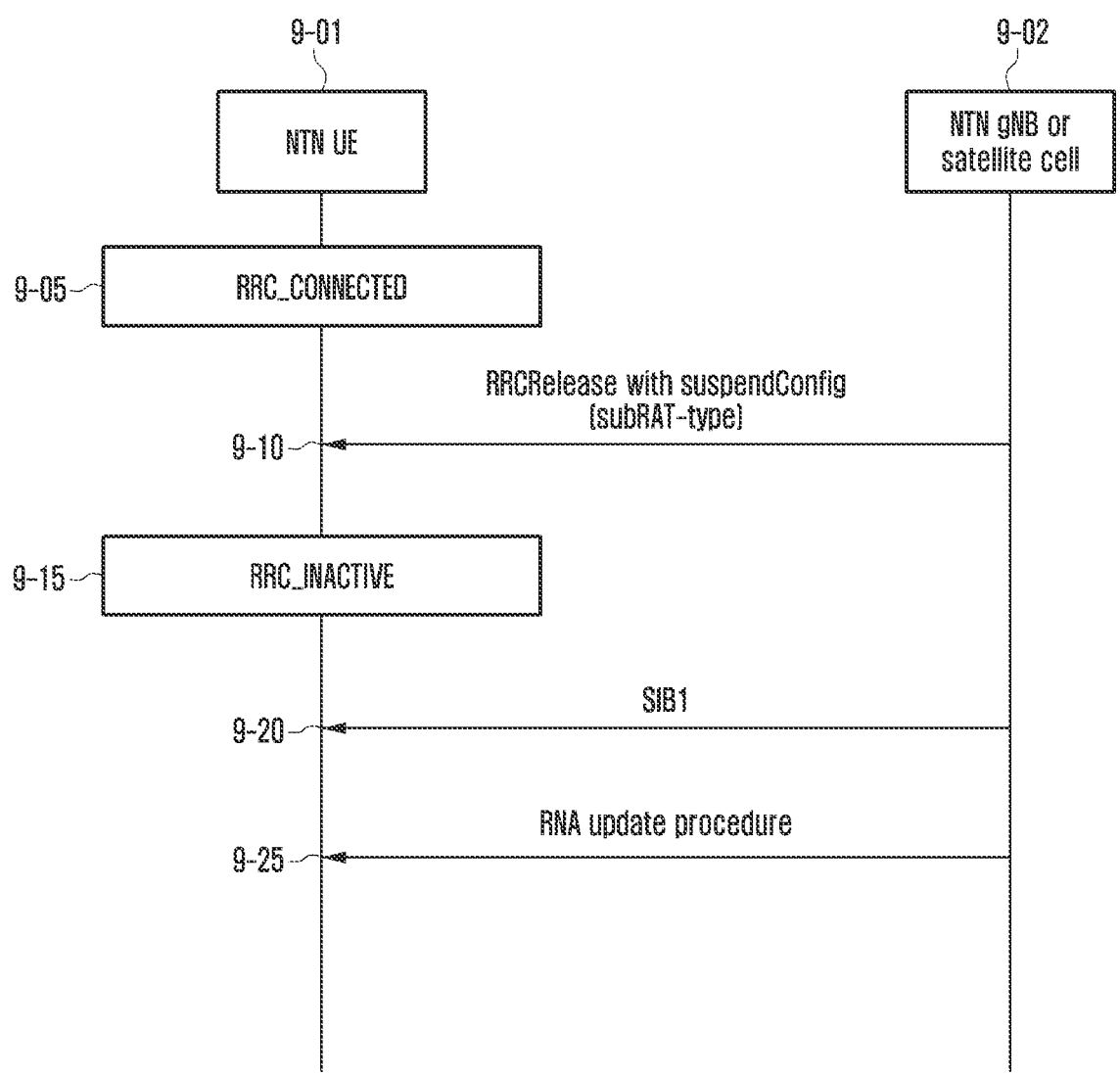
FIG. 9 is a diagram illustrating a process in which a satellite cell/base station sets a RAN-NotificationAreaInfo to an NTN UE according to an embodiment of the disclosure.

FIG. 9 is a diagram illustrating a process in which a satellite cell/base station sets a RAN-NotificationAreaInfo to an NTN UE according to an embodiment of the disclosure.

With reference to FIG. 9, an NTN UE 9-01 may set an RRC connection with an NTN gNB or a satellite cell 9-02, and may be in an RRC connected state (9-05).

In step 9-10, the NTN gNB or the satellite cell 9-02 may transmit an RRC connection release message including a suspendConfig to the NTN UE 9-01. In the disclosure, the NTN gNB or the satellite cell may set a sub-RAT type when setting a ran-NotificationAreaInfo stored in the suspendConfig to the NTN UE 9-01. As an example, the NTN gNB or the satellite cell may include the sub-RAT type, and may set a PLMN-RAN-AreaConfig or PLMN-RAN-AreaCell. Further, the NTN gNB or the satellite cell may include an indicator indicating whether a satellite is supported or an information element in the PLMN-RAN-AreaConfig or the PLMN-RAN-AreaCell.

In step 9-15, the NTN UE 9-01 may apply an RRC connection release message received in step 9-10, and may be transitioned to an RRC inactive mode.

In step 9-20, the NTN UE 9-01 may read an SIB1 message from a serving cell through a cell (re)selection process. If the serving cell does not belong to the ran-NotificationAreaInfo received in step 9-10, the UE may start an RNA update procedure in step 9-25. The RNA update procedure may follow the above-described embodiment.

Figure 10:
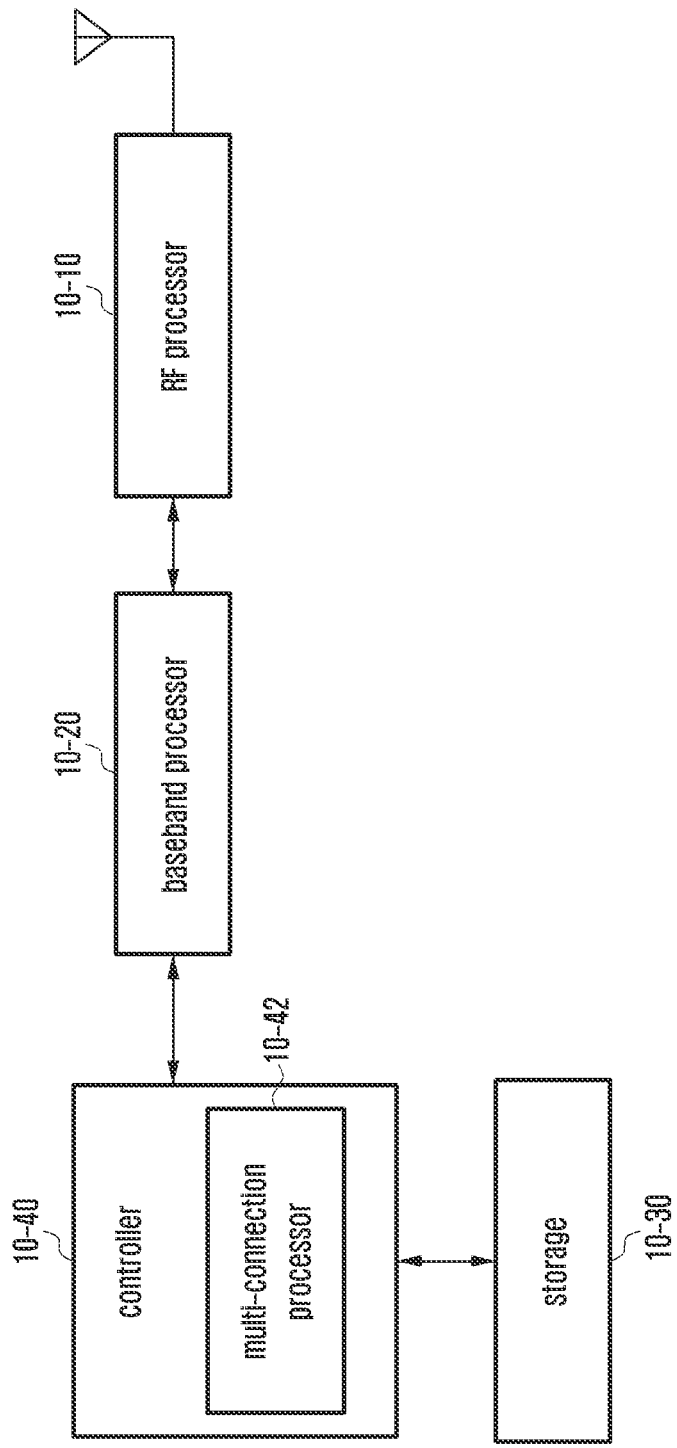
FIG. 10 is a block diagram illustrating the internal structure of a UE according to an embodiment of the disclosure.

FIG. 10 is a block diagram illustrating the internal structure of a UE according to an embodiment of the disclosure.

With reference to the drawing, the UE includes a radio frequency (RF) processor 10-10, a baseband processor 10-20, a storage 10-30, and a controller 10-40.

The RF processor 10-10 performs a function for transmitting and receiving a signal on a radio channel, such as signal band conversion and amplification. That is, the RF processor 10-10 performs up-conversion of a baseband signal provided from the baseband processor 10-20 into an RF-band signal to transmit the converted signal through an antenna, and performs down-conversion of the RF-band signal received through the antenna into a baseband signal. For example, the RF processor 10-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Further, the RF processor 10-10 may include a plurality of RF chains. Further, the RF processor 10-10 may perform beamforming. For the beamforming, the RF processor 10-10 may adjust phases and sizes of signals transmitted or received through the plurality of antennas or antenna elements. Further, the RF processor 10-10 may perform MIMO, and may receive several layers during performing of the MIMO operation.

The baseband processor 10-20 performs a conversion function between a baseband signal and a bit string in accordance with the physical layer standard of the system. For example, during data transmission, the baseband processor 10-20 generates complex symbols by encoding and modulating a transmitted bit string. Further, during data reception, the baseband processor 10-20 restores a received bit string by demodulating and decoding the baseband signal provided from the RF processor 10-10. For example, in case of complying with an orthogonal frequency division multiplexing (OFDM) method, during data transmission, the baseband processor 10-20 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 10-20 divides the baseband signal being provided from the RF processor 10-10 in the unit of OFDM symbols, restores the signals mapped onto the subcarriers through the fast Fourier transform (FFT), and then restores the received bit string through demodulation and decoding.

The baseband processor 10-20 and the RF processor 10-10 transmit and receive the signals as described above. Accordingly, the baseband processor 10-20 and the RF processor 10-10 may be called a transmitter, a receiver, a transceiver, or a communication unit. Further, in order to support different radio access technologies, at least one of the baseband processor 10-20 and the RF processor 10-10 may include a plurality of communication modules. Further, in order to process signals of different frequency bands, at least one of the baseband processor 10-20 and the RF processor 10-10 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter (mm) wave (e.g., 60 GHz) band.

The storage 10-30 stores therein a basic program for an operation of the UE, application programs, and data of configuration information. In particular, the storage 10-30 may store information related to a second access node that performs wireless communication by using a second radio access technology. Further, the storage 10-30 provides stored data in accordance with a request from the controller 10-40.

The controller 10-40 controls the overall operations of the UE. For example, the controller 10-40 transmits and receives signals through the baseband processor 10-20 and the RF processor 10-10. Further, the controller 10-40 records or reads data in or from the storage 10-30. For this, the controller 10-40 may include at least one processor. For example, the controller 10-40 may include a communication processor (CP) that performs a control for communication and an application processor (AP) that controls an upper layer, such as an application program.

Figure 11:
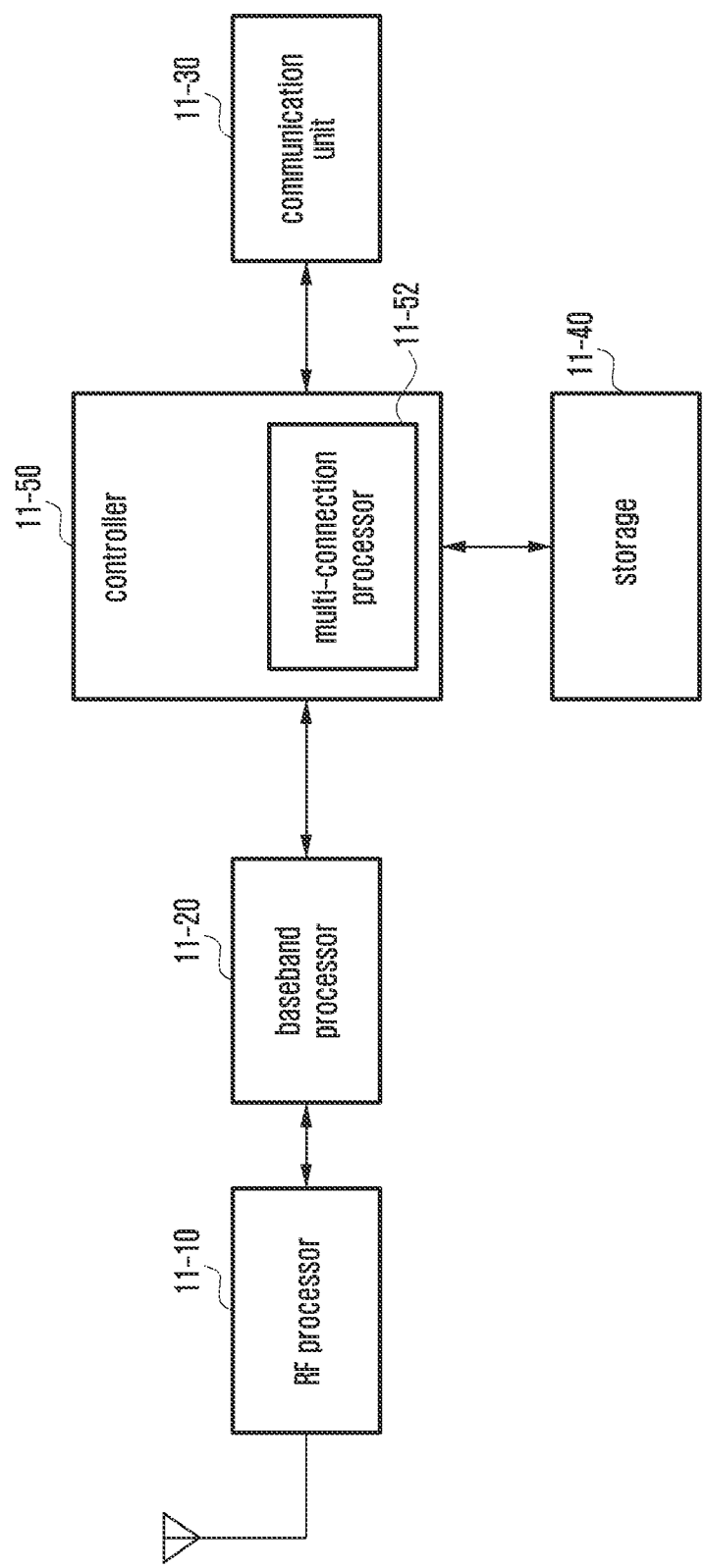
FIG. 11 is a block diagram illustrating the constitution of an NR base station according to an embodiment of the disclosure.

FIG. 11 is a block diagram illustrating the constitution of an NR base station according to an embodiment of the disclosure.

As illustrated in the drawing, the base station is configured to include an RF processor 11-10, a baseband processor 11-20, a backhaul communication unit 11-30, a storage 11-40, and a controller 11-50.

The RF processor 11-10 performs a function for transmitting and receiving signals on a radio channel, such as signal band conversion and amplification. That is, the RF processor 11-10 performs up-conversion of a baseband signal provided from the baseband processor 11-20 into an RF-band signal to transmit the converted signal through an antenna, and performs down-conversion of the RF-band signal received through the antenna into a baseband signal. For example, the RF processor 11-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 11-10 may include a plurality of RF chains. Further, the RF processor 11-10 may perform beamforming. For the beamforming, the RF processor 11-10 may adjust phases and sizes of signals being transmitted or received through the plurality of antennas or antenna elements. The RF processor may perform a downward MIMO operation through transmission of one or more layers.

The baseband processor 11-20 performs a conversion function between a baseband signal and a bit string in accordance with the physical layer standard of the first radio access technology. For example, during data transmission, the baseband processor 11-20 generates complex symbols by encoding and modulating a transmitted bit string. Further, during data reception, the baseband processor 11-20 restores a received bit string by demodulating and decoding the baseband signal provided from the RF processor 11-10. For example, in case of complying with an OFDM method, during data transmission, the baseband processor 11-20 generates complex symbols by encoding and modulating a transmitted bit string, performs mapping of the complex symbols to subcarriers, and then configures OFDM symbols through the IFFT operation and CP insertion. Further, during data reception, the baseband processor 11-20 divides the baseband signal provided from the RF processor 11-10 in the unit of OFDM symbols, restores the signals mapped to the subcarriers through the FFT operation, and then restores the received bit string through demodulation and decoding. The baseband processor 11-20 and the RF processor 11-10 transmit and receive the signals as described above. Accordingly, the baseband processor 11-20 and the RF processor 11-10 may be called a transmitter, a receiver, a transceiver, a communication unit, or a wireless communication unit.

The backhaul communication unit 11-30 provides an interface for performing communication with other nodes in the network. That is, the backhaul communication unit 11-30 converts a bit string being transmitted from the primary base station to other nodes, for example, an auxiliary base station and a core network, into a physical signal, and converts the physical signal being received from other nodes into a bit string.

The storage 11-40 stores therein a basic program for an operation of the main base station, application programs, and data of configuration information. In particular, the storage 11-40 may store information about a bearer allocated to the connected UE and the measurement result reported from the connected UE. Further, the storage 11-40 may store information that becomes the basis of determination of whether to provide or suspend a multi-connection to the UE. Further, the storage 11-40 provides stored data in accordance with a request from the controller 11-50.

The controller 11-50 controls the overall operation of the primary base station. For example, the controller 11-50 transmits and receives signals through the baseband processor 11-20 and the RF processor 11-10 or through the backhaul communication unit 11-30. Further, the controller 11-50 records or reads data in or from the storage unit 11-40. For this, the controller 11-50 may include at least one processor.

Meanwhile, in the drawings for describing the method of the disclosure, the order of explanation does not necessarily correspond to the order of execution, and the temporal precedence between the explanation and the execution may be changed or the explanation and the execution may be executed in parallel.

Further, in the drawings for describing the method of the disclosure, only some constituent elements may be included with other constituent elements omitted within the scope that does not harm the essence of the disclosure.

Further, in the method of the disclosure, some or all of the contents included in the respective embodiments may be combined and executed within the scope that does not harm the essence of the disclosure.

Further, in the disclosure, information included in a message is to explain an example of the disclosure, and it is possible to omit some information or to include additional information. The embodiments of the disclosure disclosed in the specification and drawings are merely to present specific examples in order to facilitate the explanation of the contents of the disclosure and to help understanding of the disclosure, but are not intended to limit the scope of the disclosure. It is apparent to those of ordinary skill in the art to which the disclosure pertains that other modified examples based on the technical idea of the disclosure can be embodied in addition to the embodiments disclosed herein.

The invention claimed is:

1. A method performed by a user equipment (UE) in a stand-alone non-public network (SNPN) access mode in a communication system, the method comprising:
    receiving, from a base station, a radio resource control (RRC) release message including suspension configuration information,
    wherein the suspension configuration information includes notification area information including one of a cell list or a radio access network (RAN) area configuration list;
    entering an RRC inactive state based on the RRC release message;
    performing a cell selection procedure; and
    performing an RAN notification area (RNA) update procedure in case that
    a serving cell does not belong to the notification area information,
    wherein in case that the cell list is included in the notification area information,
    a public land mobile network (PLMN) identity is not included in the
    cell list for the UE in the SNPN access mode and
    the cell list
    is associated with a registered SNPN for the UE in the SNPN access mode, and
    wherein in case that the RAN area configuration list is included in the notification area information,
    the PLMN identity is not included in the RAN area configuration list for the UE in the SNPN access mode and
    the RAN area configuration list is associated with the registered SNPN for the UE in the SNPN access mode.

2. The method of claim 1, wherein an identity of the registered SNPN includes the PLMN identity and a network identifier.

3. The method of claim 1, wherein a PLMN selection procedure is not performed for the UE in the SNPN access mode.

4. The method of claim 1, wherein the cell list includes at least one cell identity.

5. The method of claim 1, wherein the RAN area configuration list includes at least one RAN area configuration, and
    wherein the at least one RAN area configuration includes a tracking area code and at least one RAN area code.

6. The method of claim 1, wherein the cell list or the RAN area configuration list further includes a network identifier list, and
    wherein the network identifier list is configured per PLMN.

7. A user equipment (UE) operating in a stand-alone non-public network (SNPN) access mode in a communication system, the UE comprising:
    a transceiver; and
    a controller coupled with the transceiver and configured to:
    receive, from a base station, a radio resource control (RRC) release message including suspension configuration information,
    wherein the suspension configuration information includes notification area information including one of a cell list or a radio access network, RAN, area configuration list, enter an RRC inactive state based on the RRC release message, perform a cell selection procedure, and perform an RAN notification area (RNA) update procedure in case that a serving cell does not belong to the notification area information, wherein in case that the cell list is included in the notification area information, a public land mobile network (PLMN) identity is not included in the cell list for the UE in the SNPN access mode and the cell list is associated with a registered SNPN for the UE in the SNPN access mode, and wherein in case that the RAN area configuration list is included in the notification area information, the PLMN identity is not included in the RAN area configuration list for the UE in the SNPN access mode and the RAN area configuration list is associated with the registered SNPN for the UE in the SNPN access mode.

8. The UE of claim 7, wherein an identity of the registered SNPN includes the PLMN identity and a network identifier.

9. The UE of claim 7, wherein a PLMN selection procedure is not performed for the UE in the SNPN access mode.

10. The UE of claim 7, wherein the cell list includes at least one cell identity.

11. The UE of claim 7, wherein the RAN area configuration list includes at least one RAN area configuration, and wherein the at least one RAN area configuration includes a tracking area code and at least one RAN area code.

12. The UE of claim 7, wherein the cell list or the RAN area configuration list further includes a network identifier list, and wherein the network identifier list is configured per PLMN.

13. The method of claim 1, wherein the RNA update procedure is not performed in case that the serving cell belongs to the notification area information.

14. The UE of claim 7, wherein the RNA update procedure is not performed in case that the serving cell belongs to the notification area information.

* * * * *